US011396895B2

(12) United States Patent
Mollan et al.

(10) Patent No.: US 11,396,895 B2
(45) Date of Patent: Jul. 26, 2022

(54) MODULAR SINGLE HEADER MANIFOLD (71) Applicant: Vetco Gray Scandinavia AS, Sandvika (NO)

(72) Inventors: Tore Mollan, Oslo (NO); Staale Svindland, Skreia (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 151 days.

(21) Appl. No.: 16/651,822

(22) PCT Filed: Sep. 13, 2018

(86) PCT No.: PCT/EP2018/074814
§ 371 (c)(1),
(2) Date: Mar. 27, 2020

(87) PCT Pub. No.: WO2019/063311
PCT Pub. Date: Apr. 4, 2019

(65) Prior Publication Data
US 2020/0248724 A1    Aug. 6, 2020

(30) Foreign Application Priority Data
Sep. 29, 2017   (NO) .................................. 20171566

(51) Int. Cl.
*E21B 41/00*     (2006.01)
*E21B 43/017*    (2006.01)
(Continued)

(52) U.S. Cl.
CPC ...... *F15B 13/0817* (2013.01); *E21B 41/0007* (2013.01); *F16K 27/003* (2013.01);
(Continued)

(58) Field of Classification Search
CPC .. E21B 41/0007; E21B 43/017; F16K 27/003; F15B 13/0817
See application file for complete search history.

(56) References Cited

U.S. PATENT DOCUMENTS 3,134,395 A * 5/1964 Glasgow ................. F16K 11/22
                                                137/315.01
6,257,268 B1 * 7/2001 Hope ..................... G05D 16/103
                                                     137/112
(Continued)

FOREIGN PATENT DOCUMENTS

GB        2285647 A * 7/1995 ........... E21B 33/035
WO   WO2016174166 A1   11/2016

OTHER PUBLICATIONS

International Search Report of the International Searching Authority for PCT/EP2018/074814 dated Dec. 7, 2018.

*Primary Examiner* — Matthew R Buck
(74) *Attorney, Agent, or Firm* — Baker Hughes Patent Org.

(57) ABSTRACT

The present invention relates to hydrocarbon well fluid manifold module (1) with a manifold module housing (9) having a transversal bore terminating in a longitudinal bore (3) in fluid connection with the transversal bore (6). One or more cut off valves are located (7) in the transversal bore (6). The longitudinal bore (3) extend through the module housing (9) and form a first flow port (11) and a second flow port (12) aligned with the first flow port (11). Plane, connecting surfaces surround the two flow ports (11,12). The two flow ports and connecting surfaces are identical. The first connecting surface (13) and the second connecting surface (14) are adapted to be connected to at least one further similar manifold module (20). The invention also concerns a manifold for a hydrocarbon well assembled of such modules.

3 Claims, 6 Drawing Sheets (51) Int. Cl.
  *F16K 27/00*   (2006.01)
  *F15B 13/08*   (2006.01)
  *E21B 33/035*  (2006.01)
  *E21B 34/04*   (2006.01)

(52) U.S. Cl.
  CPC ............ *E21B 33/035* (2013.01); *E21B 34/04* (2013.01); *E21B 43/017* (2013.01)

(56) References Cited

U.S. PATENT DOCUMENTS

2017/0226826 A1* 8/2017 Theiss .................... E21B 41/04
2017/0241243 A1* 8/2017 Gomes Martins .. E21B 43/0175
2018/0142538 A1  5/2018 Hestetun et al.

* cited by examiner

MODULAR SINGLE HEADER MANIFOLD

The present invention relates to a manifold module for a manifold for hydrocarbon wells and a manifold assembled of several such similar manifold modules.

Manifolds for hydrocarbon wells are used to join the flow of hydrocarbons from several wells, and include a number of inlets and an outlet. The number of inlets for the fluid flow will depend on the number of wells in the vicinity of the manifold. The manifold joins the fluid produced by the wells to one flow.

Such manifolds are in some cases also used for injecting fluids into the wells to increase reservoir pressure and to facilitate hydrocarbon production. The injecting fluid flows in the opposite direction of the fluid produced by the well. In this case, both a production manifold and a separate injection manifold is required.

Such manifolds are typically located subsea and thus installed and operated using ROVs. Accordingly, the manifolds include connections for pipelines etc. that are adapted for ROV use. The actuators and auxiliary equipment is then adapted for subsea use.

Regulations typically demands double cut off valves for each well to provide a failsafe system with redundant valves and actuators to ensure that the flow from each well can be stopped individually and reliably.

Manifolds are traditionally bespoke and adapted to specific requirements and includes a number of inlets or outlets adapted to the number of wells the manifold is designed to serve. Accordingly, suppliers make each manifold on agreement with customer, which lead to a certain production and assembly period. Each manifold design includes a high number of parts, and the requirement for several designs increases this number, making delivery times long and bespoke manifolds expensive.

A modular design enables a stocking program which again will lead to a shorter delivery period as the main components are available and the production period is limited to assembly of standard modules and elements.

It is thus an object of the present invention to provide a manifold assembled of several, equal, standardized manifold modules. Standardized manifold modules improve stocking possibilities and simplifies assembly and design of varying manifold configurations with different number of inlets and outlets. Another purpose is to provide a manifold system that is easy to adapt and that provides a platform catering for specific needs. The system focuses on flexibility with as few parts as practical.

The modular manifold of the invention reduces the schedule with a pre-stocked strategy, where each module include a module block is in store at a forage master, ready to be heat treated according to client specifications. The prestocking reduces the schedule and reduces the risk in projects. An ingot of each manifold module can cover a header bore size in the range 8-16" (203 mm406 mm) and the transversal bore/branch holes size in the range from 5-8" (127 mm-203 mm).

A single block raw shape can be stocked as a "green forging". A green forging is the forging before it is heat treated.

In the following is the term "hydrocarbon well fluid manifold" intended to cover manifolds handling fluids in connection with wells producing hydrocarbon fluids. The expression is also intended to cover manifolds for injecting fluids into a hydrocarbon well even if the injected fluid not includes hydrocarbons. Furthermore may such wells also produce other fluids than hydrocarbons such as water.

Such hydrocarbon wells are typically located subsea on a seabed.

Accordingly, the present invention relates to a hydrocarbon well fluid manifold module comprising a manifold module housing having a transversal bore terminating in a longitudinal bore in fluid connection with the transversal bore. At least one cut off valve is adapted to be actuated by an actuator in the transversal bore. A connection hub with a fluid port is adapted for coupling the transversal bore to a well. The longitudinal bore extend through the module housing, forming a first flow port and a second flow port aligned with the first flow port. A first, plane, connecting surface surrounds the first flow port. A second, plane, connecting surface surrounds the second flow port. The first connecting surface is parallel to and similar with the second connecting surface, whereby the first connecting surface and the second connecting surface is adapted to be connected to at least one further similar manifold module.

The housing may be formed as one unitary metal block, whereby the longitudinal bore and the transversal bore terminating in the longitudinal bore form a T-shaped bore inside the unitary metal block.

Four connection bolt bores may surround the longitudinal bore.

The hydrocarbon well fluid manifold module may include two actuator actuated cut off valves in the transversal bore providing a redundant system.

The longitudinal bore may be uniform and have an internal diameter in the range from 8-16" (203 mm-406 mm) and the transversal bore may have an internal diameter in the range from 5-8" (127 mm-203 mm).

Furthermore the present invention includes a manifold for controlling flow of fluids to or from a hydrocarbon well, assembled of a plurality of manifold modules as described above.

Accordingly, the present invention concerns hydrocarbon manifold assembled of a plurality of hydrocarbon well fluid manifold modules, including at least a first and a second well manifold module, each comprising a manifold module housing having a transversal bore terminating in a longitudinal bore in fluid connection with the transversal bore. At least one cut off valve is adapted to be actuated by an actuator in the transversal bore. A fluid port includes a connection adapted for coupling the transversal bore to a well. The longitudinal bore extending through the module housing form a first flow port and a second flow port aligned with the first flow port. A first, plane, connecting surface surround the first flow port and a second, plane, connecting surface surround the second flow port. The first connecting surface is parallel to and similar with the second connecting surface. The first, plane, connecting surface of a first well manifold module is in sealing contact with a first, plane, connecting surface of a second well manifold module. A termination element such as a sealing blanking plate or a header connection module is in sealing contact with a second, plane, connecting surface of the first manifold module. A valve is in sealing contact with a connecting surface of one of the plurality of well manifold modules.

The plurality of hydrocarbon well fluid manifold modules may be identical.

The termination element may be a sealing blanking plate or a header connection module.

DETAILED DESCRIPTION OF EMBODIMENTS OF THE INVENTION WITH REFERENCE TO THE DRAWINGS

Figure 1:
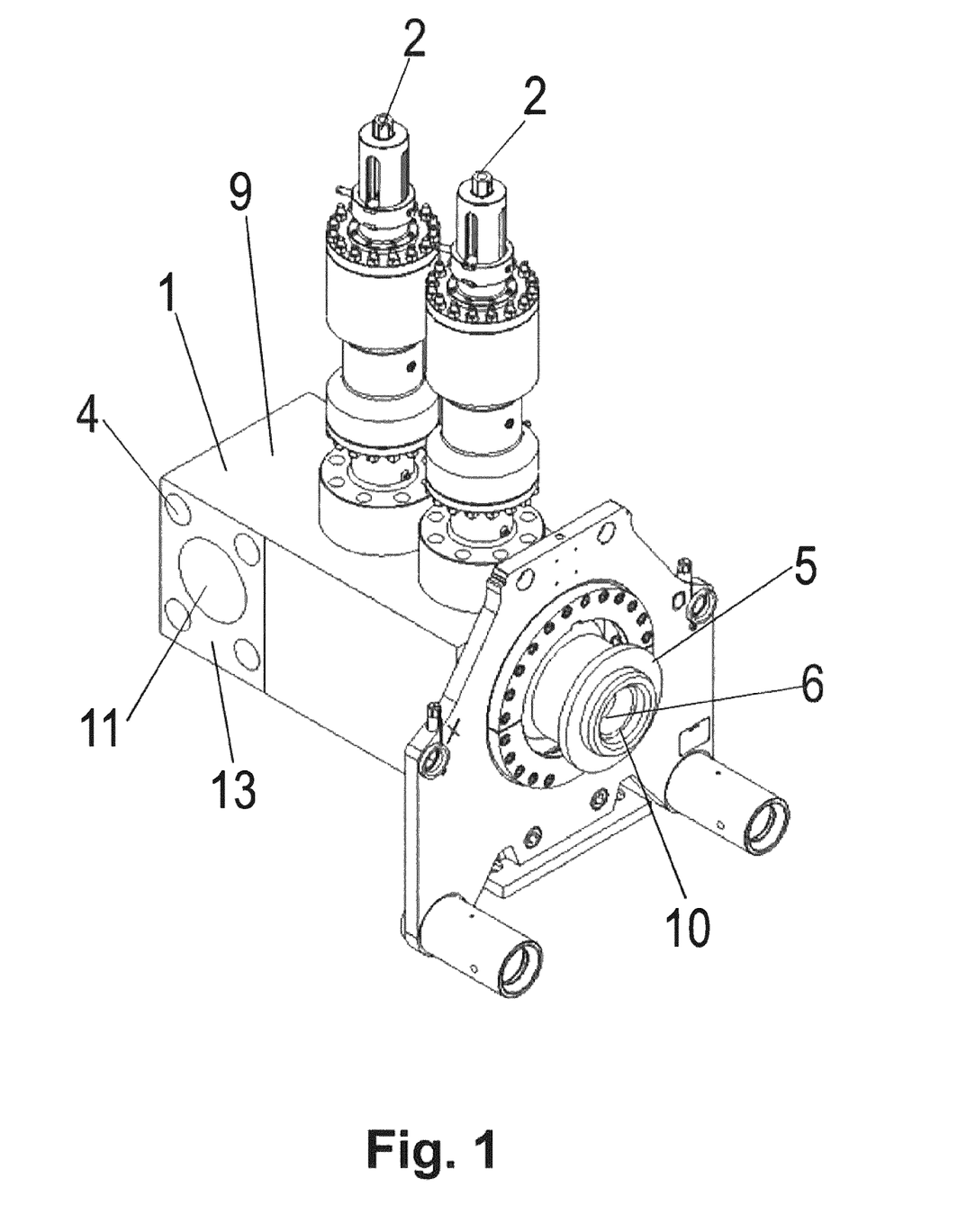
FIG. 1 is a perspective view of a manifold module of the invention.

FIG. 1 is a perspective view of a manifold module 1 of the invention. The manifold module 1 is formed as a manifold module housing 9 forming a standard block with standardised dimensions and connections, enabling the assembly of a modular system. The manifold module housing 9 is formed as a rectangular block with right angled sides and includes three ports 10, 11 and two cut off valve actuators 2 actuating two cut off valves inside the manifold module housing 9. (The third port is not shown on FIG. 1) Two cut off valve actuators 2 and cut off valves provides a failsafe system with one redundant valve and actuator assembly. An alternative embodiment (not shown) includes one cut off valve actuator 2 and one ROV actuated cut off valve. The manifold module housing 9 includes a branch port 10, a first header port 11 and a second header port (not shown) corresponding to and identical with the first header port. The header ports 11 are adapted to connect the manifold module 1 to other similar or identical manifold modules, a header connection module, a header connection valve module or a blinding element, closing a header port 11.

The manifold module can be used both in an injection manifold and a production manifold, and the ports have therefore not been defined as inlet ports or outlet ports. In a production manifold, will however the branch port 10 be an inlet port, and the produced fluid will exit through a header port. In an injection manifold, will however, the branch port 10 be an exit port.

The first and second header ports 11 are surrounded by first and second plane, parallel connecting and sealing surfaces 13, facing away from each other, located at each side of the rectangular manifold module housing 9. Metal seals are typically used on the interface to ensure proper sealing and to prevent leaks.

The first and second header ports 11 are connected by a header bore 3 extending through the manifold module housing 9. Four module connection holes 4 extending parallel to the header bore 3 also extend through the manifold module housing to allow bolts or other mechanical fastening means to extend through the holes for fastening purposes. A connection guiding system 21 is bolted to the manifold module housing 9. The connection guide system 21 includes elements allowing the use of a ROV to connect a line to/from a hydrocarbon well. These connections are typically standardized connections. A connection hub 5 also forms a part of the connection to a line to/from a hydrocarbon producing well. The connection hub 5 may be a part of the manifold module housing 9 or may be bolted on to the housing as a separate unit. A branch hole 6 extending from the branch port 10 provides a flow path past the two cut-off/isolation valves and into the header bore.

Figure 2:
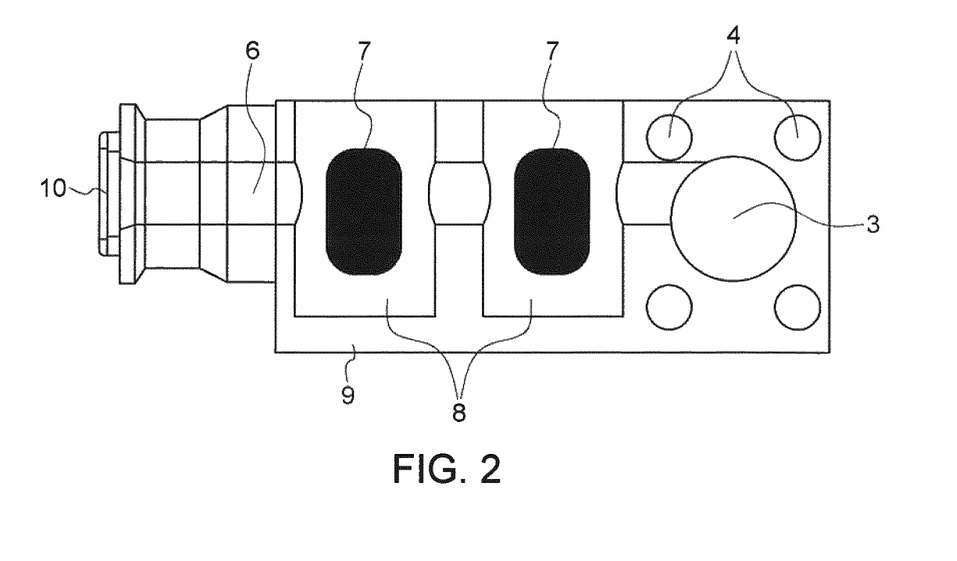
FIG. 2 is a cross section of a manifold module housing of the invention.

FIG. 2 is a cross section of the manifold module housing 9 and shows the header bore 3 and the four module connection holes 4. The manifold module housing 9 includes two isolation valve cavities 8 for the two isolation valves 7. The isolation valves 7 are included to enable isolating each hydrocarbon well connected to the manifold individually. The branch hole 6 extends from the branch port 10, past the valve cavities 8 and into the header bore 3. The branch hole 6 and the header bore 3 form a T when seen in a view perpendicular to the view on FIG. 2. (from the top or bottom) The branch connection hub is formed in the extension of the branch hole 6. The housing is a one-piece housing formed as a unitary solid steel block that will be heat treated according to required specifications.

Figure 3:
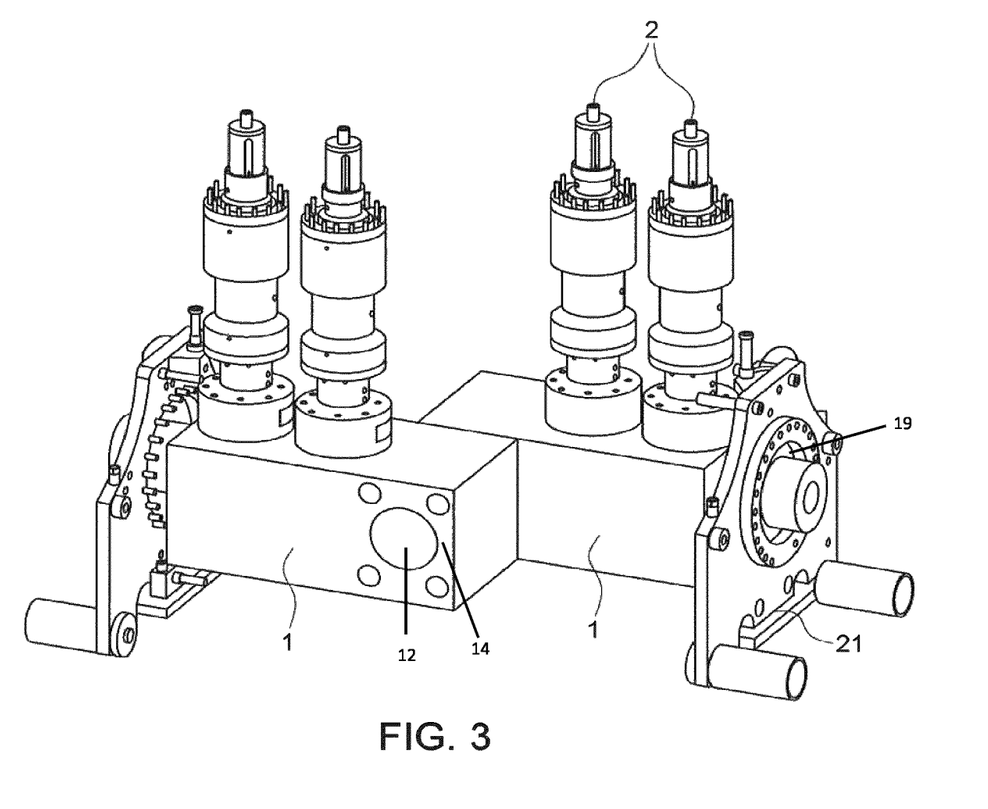
FIG. 3 shows two similar manifold modules of the invention fixed to each other.

FIG. 3 shows two similar manifold modules 1 of the invention fixed to each other, aligning the respective connecting and sealing surfaces, header ports and thus header bores. The header bore that is formed is straight and has a uniform diameter along the bore. The two adjoining manifold modules 1 are assembled with their respective branch ports facing in opposite directions and away from each other to allow the connection guide system 21 to be situated in an open space next to or between each manifold module housing. The two valve actuators 2 may be identical or of different types.

Figure 4:
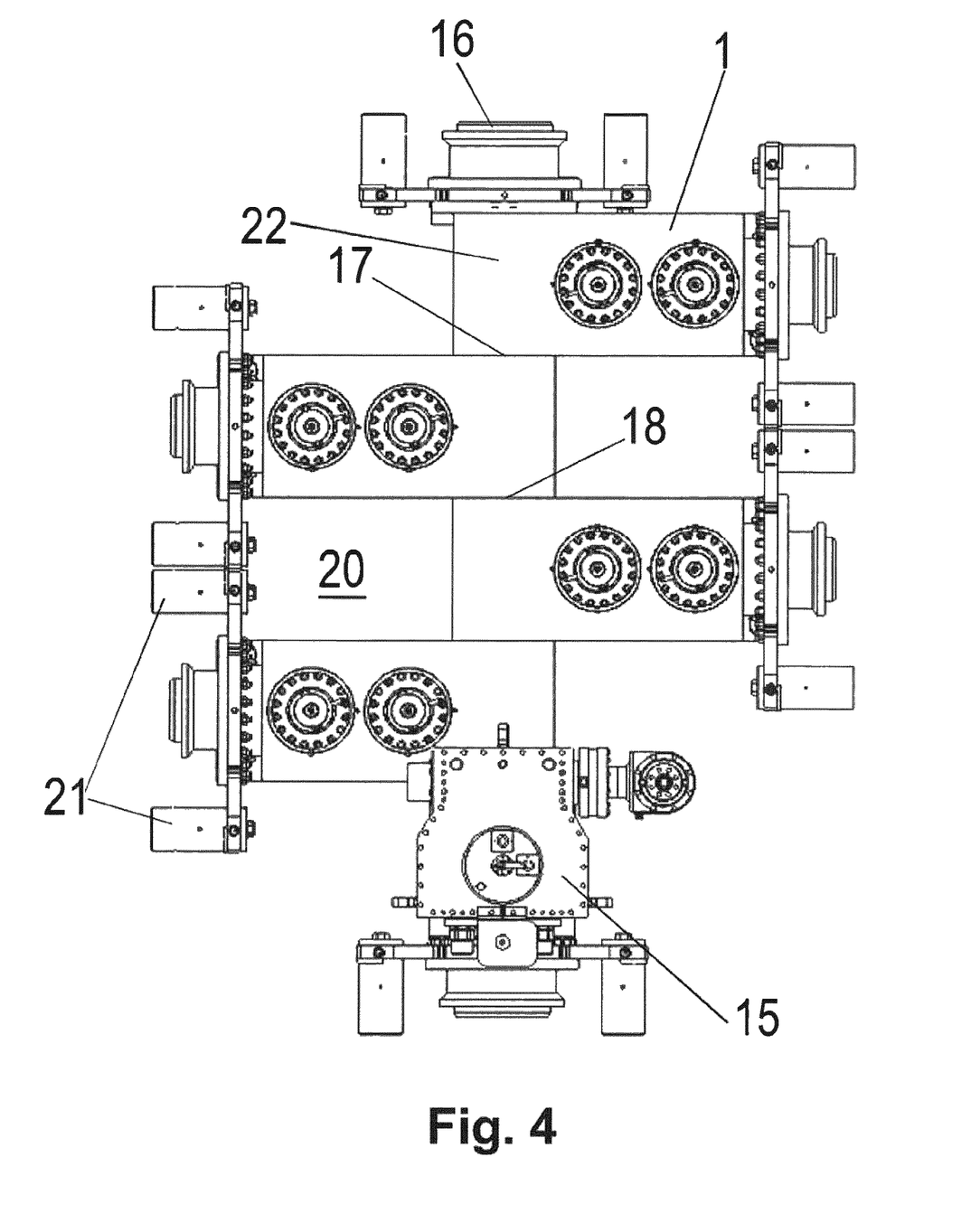
FIG. 4 shows four similar manifold modules of the invention assembled to a manifold.

FIG. 4 shows four similar manifold modules 1 of the invention assembled to a manifold 22. A header connection module 16 is attached to one of the two header bore ends and a header isolation valve 15 is attached to the other of the two header bore ends. The first and second connecting surfaces of each manifold module 1 are connected to connecting surfaces of adjoining modules and form module interfaces 17 sealed with metal seals. The header bores of each of the four manifold modules 1 form one straight bore with uniform diameter along the bore.

The alternate positioning of the manifold modules with respective branch ports 10 face in opposite directions and away from each other to provide open spaces 20 allowing room for the connection guide system.

The header connection module can be substituted by a blind plug or blanking plate. Alternatively may a blind plug be installed on the header connection module.

Figure 5:
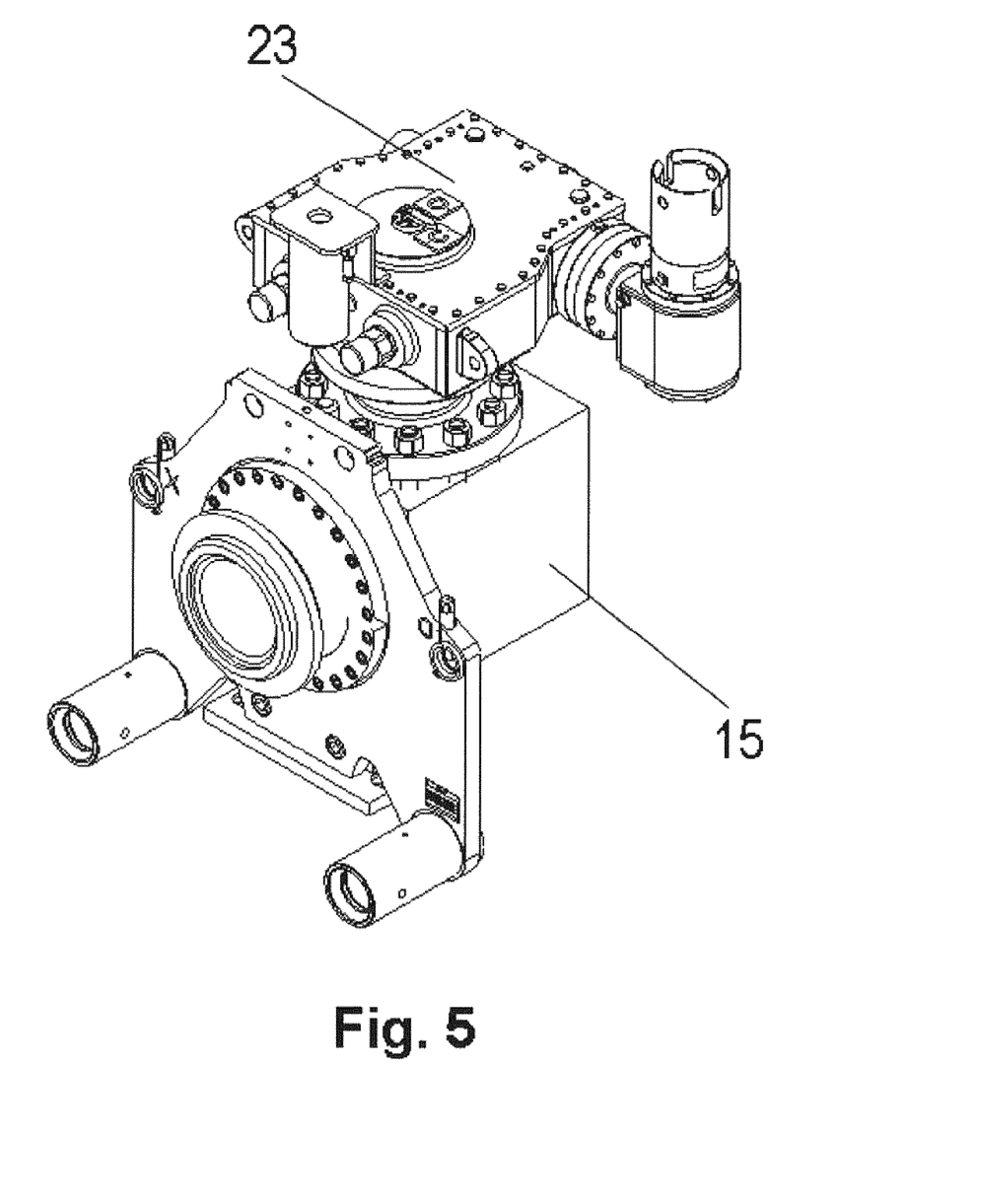
FIG. 5 shows a header isolation valve module.

FIG. 5 shows a header isolation valve module 15 with a cut off valve actuated by a header isolation valve actuator 23 and a connection guide system 21. The diameter of the bore of the header isolation valve module 15 corresponds to the bore of the header, and the header isolation valve module 15 includes a header isolation valve module connecting surface corresponding to the first and second connecting surfaces 13, 14 of each manifold module.

The header isolation valve module 15 allows the entire manifold to be isolated.

The longitudinal bore/header bore typically has an internal diameter in the range from 8-16" (203 mm-406 mm) and the transversal bore/branch holes have an internal diameter in the range from 5-8" (127 mm-203 mm).

Figure 6:
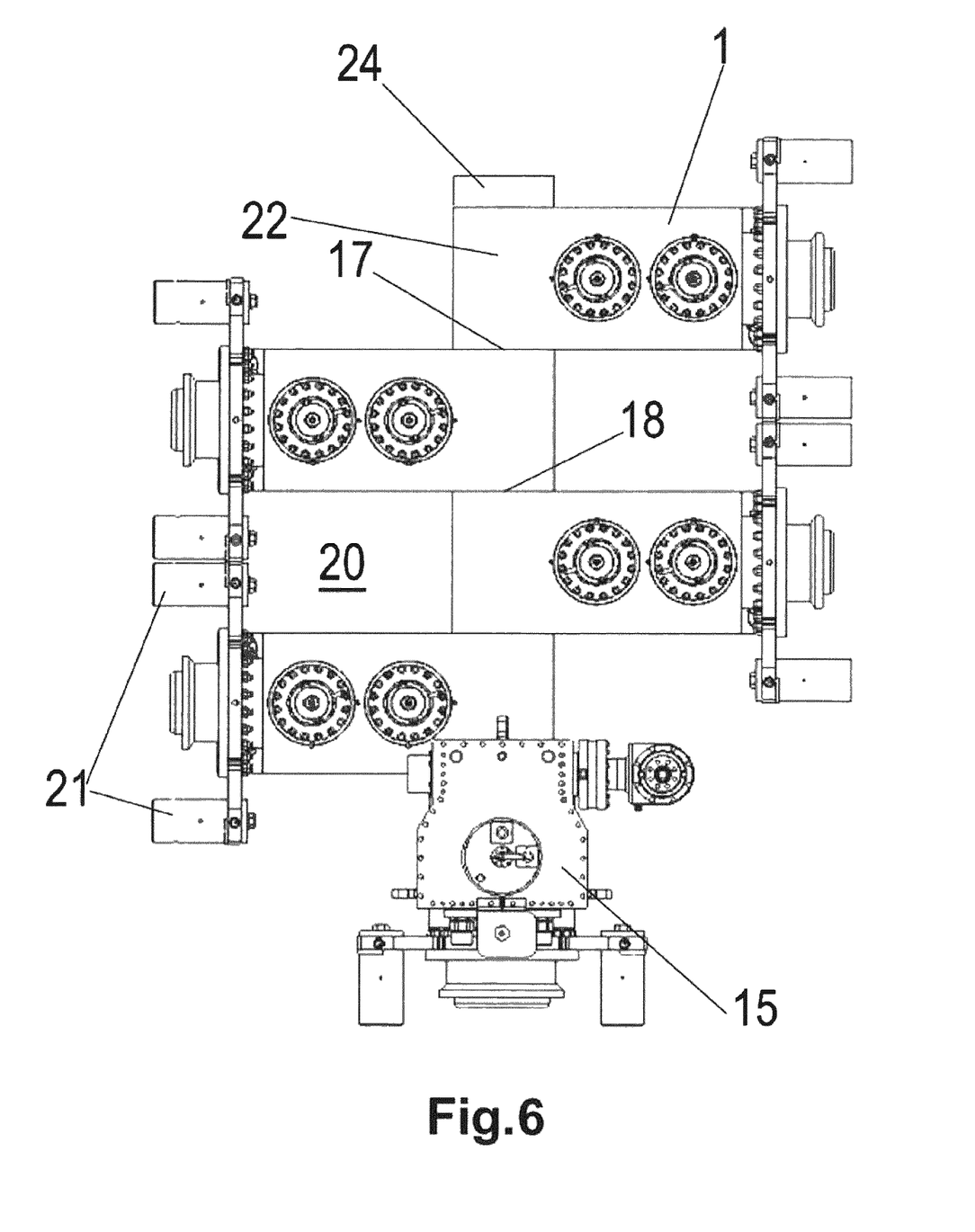
FIG. 6 corresponds to FIG. 4, but shows a blanking plate in place of a header connection module.

In FIG. 6, the header connection module 16 shown on FIG. 4 is substituted with a blanking plate 24 sealing the header bore, serving as the termination element.

| | |
|---|---|
| 1 | Manifold module |
| 2 | Isolation valve actuator |
| 3 | Header bore/longitudinal bore |
| 4 | Module connection hole |
| 5 | Connection hub |
| 6 | Branch hole/transversal bore |
| 7 | Isolation valve |
| 8 | Isolation valve cavity |
| 9 | Manifold module housing |
| 10 | Branch port |

-continued

| 11 | First header port |
| 12 | Second header port |
| 13 | First connecting surface |
| 14 | Second connecting surface |
| 15 | Header isolation valve module |
| 16 | Header connection module |
| 17 | Module interface |
| 18 | Metal seal |
| 19 | Straight header bore |
| 20 | Open space between blocks |
| 21 | Connection guide system |
| 22 | Manifold |
| 23 | Header isolation valve actuator |
| 24 | Blanking plate |

The invention claimed is:

1. A hydrocarbon well fluid manifold assembly comprising:
a plurality of hydrocarbon well fluid manifold modules, including at least a first and a second well manifold module, each comprising:
a manifold module housing having a transversal bore terminating in a longitudinal bore perpendicular to and in fluid connection with the transversal bore, wherein the longitudinal bore extends through the manifold module housing forming a first flow port and a second flow port aligned with the first flow port;
at least one cut off valve adapted to be actuated by an actuator in the transversal bore;
a fluid port with a connection adapted for coupling the transversal bore to a well; and
a first plane connecting surface surrounding the first flow port and a second plane connecting surface surrounding the second flow port, wherein the first plane connecting surface is parallel to and similar with the second plane connecting surface;
a termination element in sealing contact with the second plane connecting surface of the first manifold module; and
a valve in sealing contact with a connecting surface of one of the plurality of hydrocarbon well fluid manifold modules,
wherein the first plane connecting surface of the first well manifold module is in sealing contact with the first plane connecting surface of the second well manifold module.

2. The hydrocarbon well fluid manifold of claim 1, wherein the plurality of hydrocarbon well fluid manifold modules are identical.

3. The hydrocarbon well fluid manifold of claim 1, wherein the termination element is a sealing blanking plate or a header connection module.

* * * * *